US010292413B2

(12) United States Patent
Björck et al.

(10) Patent No.: US 10,292,413 B2
(45) Date of Patent: May 21, 2019

(54) NUTRITIONALLY BALANCED COMPOSITE MEAL FOR INFANTS AND SMALL CHILDREN AND A METHOD OF PRODUCING SAID MEAL

(71) Applicant: InnovaChildfood AB, Flyinge (SE)

(72) Inventors: Inger Björck, Billinge (SE); Elin Östman, Kävlinge (SE)

(73) Assignee: INNOVACHILDFOOD AB, Flyinge (SE)

( * ) Notice: Subject to any disclaimer, the term of this patent is extended or adjusted under 35 U.S.C. 154(b) by 219 days.

(21) Appl. No.: 15/030,117

(22) PCT Filed: Oct. 16, 2014

(86) PCT No.: PCT/SE2014/051222
§ 371 (c)(1),
(2) Date: Apr. 18, 2016

(87) PCT Pub. No.: WO2015/057151
PCT Pub. Date: Apr. 23, 2015

(65) Prior Publication Data
US 2016/0278423 A1    Sep. 29, 2016

(30) Foreign Application Priority Data
Oct. 18, 2013   (SE) ...................... 1330129

(51) Int. Cl.
*A23L 33/00*   (2016.01)
*A23L 35/00*   (2016.01)
*A23L 33/135*  (2016.01)

(52) U.S. Cl.
CPC ............ *A23L 33/135* (2016.08); *A23L 33/40* (2016.08); *A23L 35/00* (2016.08)

(58) Field of Classification Search
None
See application file for complete search history.

(56) References Cited

U.S. PATENT DOCUMENTS

| | | | | |
|---|---|---|---|---|
| 4,194,341 A * | 3/1980 | Kihnke | ............... | B65B 7/16 141/174 |
| 4,640,840 A | 2/1987 | Assinder et al. | | |
| 7,300,680 B2 * | 11/2007 | Prevost | ............... | A23J 1/14 426/46 |
| 2003/0138476 A1 * | 7/2003 | Van Leeuwen | ...... | A61K 31/195 424/439 |
| 2008/0223223 A1 * | 9/2008 | Wenger | ............... | A23N 17/005 99/447 |
| 2009/0274791 A1 * | 11/2009 | Mattson | ............... | A23C 9/1315 426/2 |
| 2010/0072099 A1 | 3/2010 | Klein | | |
| 2010/0255114 A1 * | 10/2010 | Shahkhalili | ............ | A61K 31/70 424/535 |
| 2011/0287161 A1 | 11/2011 | Weber et al. | | |
| 2012/0031805 A1 | 2/2012 | Stolarczyk | | |
| 2012/0171339 A1 | 7/2012 | Kratky et al. | | |

FOREIGN PATENT DOCUMENTS

DE          28 29 036        1/1980
WO     WO-2010/029825        3/2010

OTHER PUBLICATIONS

Berckmans: WO 2007071776, published Jun. 28, 2007 (Year: 2007).*
Baby Center: Age-by-age guide to feeding your baby, Last Reviewed: Sep. 2004, Reviewed by Nancy Showen, M.D., published at: https://web.archive.org/web/20070915195550/https://www.babycenter.com/0_age-by-age-guide-to-feeding-your-baby_1400680.bc. (Year: 2007).*
Lovemade Organic Baby Food; Posted on Aug. 27, 2013 by Sarah Andersen at http://www.minicph.com/lovemade/. (Year: 2013).*
SA: Seasoned Advice: Making bread dough in the bread maker and baking it in the oven; published online at least by Mar. 2, 2013 at: https://web.archive.org/web/20130302052057/https://cooking.stackexchange.com/questions/13500/making-bread-dough-in-the-bread-maker-and-baking-it-in-the-oven (Year: 2013).*
GK: Genius Kitchen: Hard-Boiled Egg; published online on Apr. 9, 2002 at: http://www.geniuskitchen.com/recipe/hard-boiled-eggs-24799#activity-feed (Year: 2002).*
Kratky: WO2006029298; published Mar. 16, 2006 (Year: 2006).*
Leon: A new approach to study starch changes occurring in the dough-baking process and during bread storage; Z Lebensm Unters Forsch A (1997) 204: 316Ð320. (Year: 1997).*
Kaur: Optimization of Process for Reduction of Antinutritional Factors in Edible Cereal Brans; Food Sci Technol Int. Oct. 2012;18(5):445-54. doi: 10.1177/1082013211428236. Epub Oct. 11, 2012. (Year: 2012).*
BA: Birlouez-Aragon: Evaluation of the maillard reaction in infant formulas by means of front-face fluorescence; Ann N Y Acad Sci. Jun. 2005;1043:308-18. (Year: 2005).*
Semba: Does Accumulation of Advanced Glycation End Products Contribute to the Aging Phenotype?; J Gerontol A Biol Sci Med Sci. Sep. 2010; 65A(9): 963-975. Published online May 17, 2010. doi: 10.1093/gerona/glq074 (Year: 2010).*
Bastos: Maillard Reaction Products in Processed Food: Pros and Cons; Feb. 2012; DOI: 10.5772/31925 • Source: InTech (Year: 2012).*

(Continued)

*Primary Examiner* — Patricia A George
(74) *Attorney, Agent, or Firm* — Stephen J. Weyer, Esq.; Stites & Harbison, PLLC

(57) ABSTRACT

The present invention relates to a nutritionally balanced composite meal for infants/small children, comprising at least one carbohydrate containing meal component and at least one protein containing meal component, where the individual components have been separately heat-treated. This to reduce the amount of advanced glycation end products (AGE's) generated, and control the levels of glycemic index (GI) and insulin index (II), in the composite meal. Also disclosed is a method of producing said meal.

14 Claims, No Drawings

(56) References Cited

OTHER PUBLICATIONS

Bao: Food insulin index: physiologic basis for predicting insulin demand evoked by composite meals; Am J Clin Nutr 2009;90:986-92. Printed in USA. _ 2009 American Society for Nutrition. (Year: 2009).*

Akdogan: High moisture food extrusions; published in the International Journal of Food Science and Technology 1999, 34, 195-207. (Year: 1999).*

Swedish Office Action dated May 15, 2014 in corresponding Swedish Application No. 1330129-6.

Supplementary European Search Report dated Apr. 20, 2017 in EP 14 85 4588.

Acharid, et al., "Potential of front face fluorescence as a monitoring tool of neoformed compounds in industrially processed carrot baby food", 2012, pp. 305-311, vol. 49, Food Science and Technology.

International Search Report for PCT/SE2014/051222 dated Feb. 17, 2015.

* cited by examiner

NUTRITIONALLY BALANCED COMPOSITE MEAL FOR INFANTS AND SMALL CHILDREN AND A METHOD OF PRODUCING SAID MEAL

TECHNICAL FIELD

The present invention relates to a nutritionally balanced composite meal for infants/small children, comprising at least one carbohydrate containing meal component and at least one protein containing meal component, and a method of producing said meal.

BACKGROUND

Pandemic of Obesity and MetS

The prevalence of obesity and associated metabolic disorders such as hyperlipidaemia, hypertension and impaired blood glucose regulation, commonly referred to as the metabolic syndrome (MetS) has reached pandemic proportions and is a major contributor to the burden of disease world-wide. Approximately 1.6 billion adults are overweight or obese. Currently about 366 million people are diagnosed with type 2 diabetes, and the prognosis for 2030 is 550 million. If including also other disturbances in the MetS, it is presumed that more than 30 million people in Europe and about 85 million in US receive medication for various manifestations in this syndrome. The cause for the obesity and diabetes pandemic is not fully known, but dietary factors play a major role. A common feature associated with obesity and MetS is a state of low-grade inflammation, and concomitant resistance to insulin.

Alike the situation in adults, obesity among children is an increasing problem in many countries. It is known that presence of obesity in early age is associated with increased risk of obesity in adulthood. Also, metabolic disturbances already at a low age appear to be particularly detrimental. Thus, obesity in childhood seems to cause type 2 diabetes within a shorter time period compared to the situation in adulthood. This vulnerability of obese children possibly runs in parallel to the over-all anabolic situation associated with growth in the child. According to a recent global estimate, about 170 million children are over-weight or obese. The prevalence of obesity and over-weight among pre-school children in Sweden is about 18%. Of interest in this respect is current knowledge indicating that approximately half of the European children with obesity or over-weight show elevated cardio-metabolic risk factors already at onset of puberty. According to studies in US, about 15% of obese children even display advanced MetS features such as non-alcoholic fatty liver disease.

Several large scale observational studies have demonstrated that healthy young subjects with more body fat or higher BMI have moderately higher concentrations of inflammatory markers than leaner control subjects. This is in support of the view that obesity should be considered as a state of chronic low-grade inflammation also in the young. In fact, accelerated formation of reactive oxygen species and accumulation of oxidized macro-molecules have been demonstrated in juvenile overweight and obesity.

Dietary Factors Influencing Risk Factors and Disease Development

Dietary factors are considered the single most important for development of obesity and MetS. A key factor involved in the ethiology of the MetS, is low grade inflammation. This inflammation is triggered by over-eating, but also by very specific features related to the quality of foods and meals. One example of such features includes the potency of the carbohydrates in foods to increase postprandial blood glucose after a meal. The effect of different carbohydrate foods on blood glucose response is commonly ranked by use of the Glycaemic Index (GI). The GI is defined as the incremental area under the blood glucose response up to 120 min after the test product as a percentage of the same area following ingestion of a carbohydrate equivalent amount of a reference (glucose or white bread) by the same subject. Another quality aspect of importance in relation to the inflammatory properties of food relates to its content of compounds formed during heat-processing and storage of foods containing protein and carbohydrates, so called Maillard reaction products.

From studies in healthy adults we know that not only may the amount of protein be important for the insulin response, but also the quality of the proteins. One aspect on protein quality is the process-induced loss of certain essential amino acids (e.g. Lysine), due to the Maillard reaction between proteins and reducing sugars. Later stage products of the Maillard reaction are collectively called advanced glycation end products (AGE), and they have been put forward as promotors of oxidative stress and low-grade inflammation.

In a recent report it was concluded that carbohydrate quality and quantity may influence blood lipid concentrations and inflammation in non-diabetic subjects. Consequently, high GI diets cause postprandial hyperglycaemia which in itself is an important driver of oxidative stress and inflammation. Of interest in this respect is that differences in GI of meals may influence acute formation of inflammatory metabolites, not only in diabetes, but also in young healthy subjects. Available knowledge indicates that GI of foods is ranked similarly in adults and in small children, emphasising the global importance of the GI concept across age.

During excessive heat processing of a carbohydrate source, it may be transformed into a more rapidly digestible form, causing high postprandial glycaemic responses. The potential reason for a quality loss of the carbohydrates during such conditions is that important structural features of the raw material is partly degraded, and the starch completely gelatinised and partially solubilised. Another hypothesis about how hyperglycaemia causes inflammation and vascular damage is that the high blood glucose levels promote endogenous formation of AGE products, which are described above.

As evident from the high and rising prevalence of obesity and MetS, preventive measures are needed. This calls for strategies focusing on the quality characteristics of the diet directed in particular towards the young, where infants and small children constitute a particularly important target group.

DESCRIPTION OF PROBLEM

Foods intended for infants must be microbiologically safe and heat-treated in order to gelatinize starch and denaturate proteins and thereby secure a sufficient availability of these components for enzymatic digestion. Certain foods may also contain amylase and/or protein inhibitors that may interfere with the digestive process and these must also be inactivated during heat-treatment. However, current commercial composite meal products intended for infants and small children most often consist of autoclaved or high-temperature treated blends of finely minced meal components. The severe heat-treatment is performed in order to secure a sterile product that can be stored at ambient temperature during longer time periods, up to several months. Such sterilization renders the carbohydrates rapidly available for digestion and absorption, causing high glycaemic and insulinaemic responses. Usually there is a consistency between GI and II for processed carbohydrate-rich meals. However, it has been surprisingly found that autoclaving of finely minced mixed meals appears to generate unduly high insulin responses, which in combination with elevated glycaemia may have detrimental effects on metabolism. Infants can be expected to be particularly vulnerable in this respect. From prior art it is known that heat-treatment at water activities in the lower range, such as occurring during e.g. drying of milk powder may promote high levels of AGE. However, it has been surprisingly found that currently used wet-autoclaving, in combination with long-term storage at ambient temperature, also increase reactivity between protein and carbohydrates with resulting high levels of AGE in the food product.

SUMMARY OF INVENTION

It has been surprisingly found that by introducing a combination of measures during the processing of composite meals intended for small children, important improvements in the health promoting characteristics of the food product can be obtained. The present invention describes a novel concept for precooking, storage and reheating based on minimally and separately processed meal components, yielding low levels of AGE, and improved glycaemic and insulinaemic properties, where in particular the insulin response is consistent with the magnitude of glycaemia. The meal components are kept separate also throughout storage and distribution as well as during home preparation prior to feeding the infant. This will preserve nutritional quality and counteract the pro-inflammatory characteristics related to current infant food produced according to state of the art, while at the same time offering flexible and nutritionally balanced composite meals where the child can experience the specific taste and colour of each meal component.

The invention relates to a nutritionally balanced composite meal for infants/small children, comprising at least one carbohydrate containing meal component and at least one protein containing meal component, characterized in that said at least one carbohydrate containing meal component and said at least one protein containing meal component have been separately heat-treated under optimized conditions such that;
  a) starch in said carbohydrate containing meal component is fully gelatinized and important enzyme inhibitors, such as trypsin inhibitors and lectins are sufficiently inactivated to not being able to reduce protein digestion and absorption, or otherwise introduce damage to the intestinal tract.
  b) CML levels are kept lower than 72 mg/kg protein, such as from 10 to 65, 15 to 65, 25 to 65, 25-45 or 20, 25, 30, 35-40, 45, 50, 55, 60, 65, 70, 71 or 72 mg/kg protein as measured using ELISA methodology.
  c) the product of GI and II (GI×II) does not exceed 10000, preferably remain below 8000, most desirable below 4000.
  d) II is not more than 100% above the GI, preferably below 60%, most desirable below 50%.

The carbohydrate containing meal component present within the product defined above is selected from the group consisting of cereals, pseudo-cereals, tubers, legumes in the form of pasta, potatoes, rice or combinations thereof.

The protein containing meal component present within the product defined above is selected from the group consisting of meat, fish, poultry, egg, milk, protein rich vegetable sources from the group consisting of soy, quinoa, cereals, myco-protein or combinations thereof.

The product may further comprise at least one probiotic bacteria, such as *Lactobacillus, Bifidobacterium, Roseburia, Akkermancia, Prevotella* or a combination thereof.

The product may further contain at least one prebiotic carbohydrate, such as a prebiotic carbohydrate is extracted from or present in cereals, beans, milk or roots from the group consisting of inulins, fructans, arabinoxylans, arabinogalactans, galacto-oligosaccharides, beta-glucans, resistant starch, lactulose, raffinose, melibiose or combinations thereof.

In another aspect the invention relates to a method of producing a nutritionally balanced composite meal for infants/small children, comprising at least one carbohydrate containing meal component and at least one protein containing meal component as defined above, comprising;
  a) a heat-treatment step in which said carbohydrate containing meal component and said protein containing meal component are separately heat-treated, and
  b) a packaging step in which said components are separately packed.

The method as defined above includes cooking of the individual meal components at ambient pressure and with time/temperature conditions that guarantee gelatinization of starch and inactivation of enzyme inhibitors.

The method as defined above, comprising a step wherein said meal components are subjected to heat-treatment by boiling, oven-baking (conventional or convection oven), steam injection (such as UHT), infra-red- or microwave treatment, or combinations thereof.

The method as defined above, comprises a step wherein said heat treated meal components are dried and stored at ambient temperature or below +8° C. in airtight and light protected packages; or immediately frozen and stored in a freezer also in air-tight and light protected packages.

The method as defined above comprises a step wherein said meal components are disintegrated, homogenized or minced before or after having been frozen.

The method as defined above comprising a step wherein said meal components are separately divided and frozen into suitable portions adjusted for the age of the infant.

Definitions

In the present disclosure the following definitions are used.

The metabolic syndrome (MetS) referring to the cluster of metabolic dysfunctions that identify individuals with risk of developing type 2 diabetes and cardio-vascular disease.

Unduly high insulin response refers to a food property that causes higher acute insulinaemia to a test product than estimated from its acute glycaemic response as compared with insulin and glucose responses to a reference product.

Nutritionally balanced refers to the presence of energy and essential nutrients in the appropriate amounts for the child in the meal 'as consumed'.

GI×II stands for the product of glycaemic and insulinaemic indices, respectively and is used as a measure of overall impact of a composite meal on postprandial glucose and insulin levels.

DETAILED DESCRIPTION OF THE INVENTION

General Outline of Meal Studies

Common to all studies presented below is that they have been performed in 9-21 healthy, young men and women in a cross-over fashion. All volunteers are asked to refrain from strenuous physical exercise and alcohol intake on the day before each experiment and they are fasting from 22.00 in the evening. Test products are taken as a breakfast meal in the morning of the test day, following fasting blood sampling. The glucose and insulin levels are then regularly monitored for 2-4 h after the meal in capillary blood samples.

Results

Study 1

Nine subjects made three visits at the research department and tested, in random order; white wheat bread (reference, WWB), commercial autoclaved infant food with meat and beans (MeatBean) and commercial autoclaved infant food with meat and pasta (MeatPasta). Data are unpublished. In addition to GI, II was calculated similarly from incremental insulinaemic responses.

TABLE 1

| Test meal | GI ± SEM | II ± SEM |
|---|---|---|
| WWB | $100^a$ | $100^a$ |
| MeatPasta | $77 ± 13^{ab}$ | $141 ± 30^a$ |
| MeatBean | $47 ± 11^b$ | $92 ± 13^a$ |

GI—glycaemic index,
II—insulinaemic index,
n = 9

Values in one column not followed by the same superscript letters are significantly different From this study we conclude that the pasta containing meal has a surprisingly high GI and both autoclaved meals result in unduly high insulin responses with respect to their glycaemic features.

Study 2

Fifteen subjects made 6 visits and tested, in random order; white wheat bread (reference, WWB), separately boiled pasta with separately stove-cooked meat cubes (SepBoilPCookM), separately boiled pasta with separately boiled and then autoclaved meat pieces (SepBoilPAutoM), separately boiled pasta with separately boiled and then autoclaved minced meat (SepBoilPAutoMincedM), commercial autoclaved infant food with pasta and meat (PastaMeat). Data are unpublished.

TABLE 2

| Test meal | Carbohydrates (g) | Glucose AUC 0-120 min | Insulin AUC 0-120 min |
|---|---|---|---|
| WWB | 50 | 122.0 ± 18.0 | 12.8 ± 1.2 |
| SepBoilPCookM | 50 | 67.5 ± 10.1 | 7.1 ± 0.9 |
| SepBoilPAutoMeat | 50 | 60.8 ± 9.9 | 8.3 ± 1.0 |
| SepBoilPAutoMincedM | 50 | 79.6 ± 11.9 | 9.4 ± 1.3 |
| PastaMeat | 30 | 60.7 ± 6.8 | 9.9 ± 1.0 |

From this study we conclude; 1) that the glucose responses to PastaMeat are in the same level as glycaemia after the other test meals, despite providing only 60% of the carbohydrate load, and 2) that both adding an autoclaving step as well as mincing the meat before autoclaving, respectively increase the insulin response. This speaks in favour of that the unduly high insulin responses seen with commercial autoclaved meals in Study 1 and here (PastaMeat) may partially be due to the autoclaving process rendering the carbohydrate moiety readily available and additionally to solubilization of insulin stimulating proteins.

Study 3

Nineteen subjects made 3 visits and tested, in random order; white wheat bread (reference, WWB), commercial autoclaved infant food with pasta and meat (PastaMeat), and separately boiled pasta with separately boiled and autoclaved meat (PastaMeat-separate). Data are un-published.

TABLE 3

| Test meal | GI ± SEM | II ± SEM |
|---|---|---|
| WWB | $100^a$ | $100^a$ |
| PastaMeat | $78.7 ± 12.9^b$ | $161.2 ± 19.2^b$ |
| PastaMeat-separate | $38.3 ± 3.6^c$ | $56.9 ± 5.5^c$ |

GI—glycaemic index,
II—insulinaemic index,
n = 9

Values in one column not followed by the same superscript letters are significantly different From this study we conclude that separately and gently cooked pasta has the capacity to keep both the glycaemic and insulinaemic properties of the meal low, in contrast to the commercially available option, where again the insulin response was unduly high. The high II is likely to emanate from the high availability of the carbohydrate component following commercial autoclaving, as well as from the solubilization of protein occurring at these conditions.

Study 4

The aim with this experiment was to determine the level of carboxymethyl-lysine (CML) in frozen ready-to-eat meals for adults and compare them with the corresponding autoclaved product intended for infants. CML is an accepted marker for AGE and in this study it was analyzed using GC-MS. Data are not published.

TABLE 4

| Product | mg CML/kg protein |
|---|---|
| Beef stew with potatoes (frozen) | 75.7 |
| Beef stew with potatoes (autoclaved) | 329.5 |
| Fried diced meat with onions and potatoes (frozen) | 141.9 |
| Fried diced meat with onions and potatoes (autoclaved) | 451.1 |

From this study we conclude that the levels of CML are much higher in composite meals intended for infants when compared with the corresponding meals intended for adults.

Nutritionally Balanced Composite Meal

It has been surprisingly found that by using the appropriate processing conditions characterized by mild heat-treatment, and separate processing of the meal components, important benefits can be achieved on food quality characteristics associated with risk for development of the MetS.

A nutritionally balanced composite meal for infants/small children may include potatoes, rice, cereals e.g. in the form of pasta, pseudo-cereals, tubers, legumes, meat, fish, poultry, egg, milk, protein rich vegetable sources e.g. soy, quinoa, cereals, myco-protein, fats, oils, spices, herbs, vegetables, fruits, berries, vitamins, minerals, probiotic bacteria (e.g. *Lactobacillus, Bifidobacterium, Roseburia, Akkermancia, Prevotella*), texturing agents, stabilisers, vinegar, prebiotics e.g. inulins, fructans, arabinoxylans, arabinogalactans, galacto-oligosaccharides, beta-glucans, resistant starch, lactulose, raffinose, melibiose.

Processing conditions for the carbohydrate and protein containing components, respectively, must be optimised to, not only secure the microbiological safety, but also result in fully gelatinized starch as well as sufficient inactivation of enzyme inhibitors like trypsin inhibitor, lectins etc. This is important to maintain a normal carbohydrate and protein digestion and absorption of monosaccharides and amino acids/peptides. Process optimisation should also consider formation of Maillard reaction products such as AGE, and the glycaemic and insulinaemic responses after meal.

As a result of heat-treatment AGE levels e.g. of CIVIL should not exceed 72 mg/kg protein as analyzed using ELISA methodology (MicroCoat Biotechnologie GmbH, Bernried, Germany). AGE levels may also be determined using other methodologies, e.g. GC/MS or LC/MS, but the results obtained by different methods cannot be directly compared as discussed in [1]. Processing conditions should further not lead to high blood glucose or unduly high insulin responses in the post-prandial phase as estimated using established GI methodology [2]. A combined measure of glucose and insulin responses, defined as the product of the GI and II (GI×II) is used to determine the overall impact of a composite meal. The upper limit of GI×II is 10000, preferably below 8000, most desirable below 4000.

Heat treatment of the separate meal components can be performed using e.g. boiling, oven-baking (conventional or convection oven), steam injection (such as UHT), infra-red- or microwave treatment. The choice of heat treatment is adjusted according to the characteristics of each meal component.

Composite meals intended for infants and small children must be served with small particle size, and the particle size is adjusted to the age and/or preferences of each child. Small particle size can be obtained by disintegration, homogenization or mincing. The choice of method for reducing particle size is adjusted according to the characteristics of each meal component. The reduction in particle size can be performed before or after heat-treatment and/or freeze drying.

The separate meal components may be packed into strands consisting of separable "units" made of e.g. plastic, paper, aluminium and coloured to identify the nutritional characteristic and facilitate the choice of a balanced composite meal. Units, or any combination of units, may be stored in freezer (−20° C.), fridge (below +5° C.) or at ambient temperature (+20° C.), depending on the preceding heat treatment.

Prior to ingestion, the meal components are heated separately by use of e.g. microwave oven, warm water bath, household stove etc. Excessive cooking should be avoided which could be monitored using eg. a heat sensor on the microwave safe plate, or a plastic film cover with a valve that makes a sound when the food is warm enough to release a certain amount of steam.

In order to obtain a nutritionally balanced meal, a colour key may be used, which would instruct what combination of meal components that is optimal. Protein containing components have one colour, carbohydrate containing components have another and sauces, vegetables have other specific colours. A table set including plates in e.g. plastic-composite or ceramic material, with colour segments according to the colour key, will facilitate the composition of a nutritionally balanced meal. Source of e.g. protein or carbohydrates, as well as type of sauce and vegetables can be adjusted to individual preferences as long as the colour key is complete.

EXAMPLES

Example 1 (Comparative Example Outside Invention)

Composite meal including pasta and meat sauce intended for children at 12 months of age. Produced with severe heat-treatment (autoclaving) of all meal components together for ambient storage. Heated to eating temperature in warm water bath before CML-analysis and meal intervention.

Ingredients: Tomato, water, carrot, onion, beef 8%, pasta (durum wheat, egg), root celery, rice starch, rape seed oil 2%, salt, basil, white pepper, oregano.

GI×II=12397
II in relation to GI=109%
CML=350 mg/kg protein

Example 2

Composite meal including pasta and meat sauce intended for children at 12 months of age.

Produced with minimal heat treatment of meat sauce and pasta separately using microwaves. Heat treatment intended for cold storage. Heated to eating temperature in microwave oven before CIVIL-analysis and meal intervention.

Ingredients: Water, tomato, carrot, onion, minced beef, pasta, tomato puree, root celery, maize starch, rape seed oil, salt, oregano, basil, white pepper GI×II=2166
II in relation to GI=50%
CML=56.9 mg/kg protein Example 3

Composite meal including white beans and salmon intended for children at 12 months of age. Produced with minimal heat treatment of precooked beans and salmon in milk based sauce (containing vegetables and spices) separately using microwaves. Heat treatment intended for cold storage. Heated to eating temperature in microwave oven before CML-analysis.

Ingredients: White beans, milk (1.5% fat), salmon, broccoli, root celery, sweet corn, cream (40% fat), yellow onion, tomato puree, maize starch, lemon juice, dill, mono-diglycerides, salt, white pepper.

CML=29.6 mg/kg protein

Example 4

Composite meal including chicken, potatoes and probiotic bacteria intended for children at 8 months of age. Produced with separate heat treatment of chicken in milk based sauce (containing vegetables and spices) and potatoes, respectively. After heat treatment, the chicken sauce and potatoes, respectively, was frozen and then freeze dried. Gentle disintegration of the chicken sauce and potatoes, respectively, was done after drying and the powders were packed in air-tight and light protective bags and kept at ambient temperature until used. Before consumption, the meal components were separately blended into warm water (60° C.). Probiotic bacteria (*Lactobacillus reuteri* and *Bifidobacte-* rium bifidum) were provided as freeze dried powder, and added to the chicken sauce after warm-up.

Ingredients: Potato, chicken, milk (1.5% fat), parsnip, sweet corn, red pepper, cream (40% fat), maize starch, rape seed oil, salt, basil, mono-di-glycerides, oregano, black pepper CML=52.2 mg/kg protein Example 5

Composite meal including beef with potatoes, broccoli and tomato sauce, intended for children at 8 months of age. Minced beef was heat treated with water, tomato and spices, using microwave oven. The meat sauce was portioned in aluminium pouches marked with red colour and immediately frozen. Potatoes were boiled with parsnip, carrots and salt. After being mashed together with rape seed oil, the potato blend was portioned in aluminium pouches marked with white colour. Broccoli and onion was steamed and mashed together with rape seed oil, before being portioned in aluminium units marked with green colour. The different aluminum pouches were kept frozen in the supermarket and the family made a choice of different units at the time of purchase. At home, one green (vegetables), one white (carbohydrate containing meal component) and one red (protein containing meal component) unit were chosen, to fulfill a complete colour key. The content of each unit was put on the plate having three colour marked recesses and heated to eating temperature still being kept separate on the plate.

Ingredients: Water, tomato, potato, beef, broccoli, carrot, parsnip, yellow onion, maize starch, rape seed oil, tomato puree, salt, oregano, red pepper (dried), white pepper CML=53.6 mg/kg protein Example 6

Composite meal including pasta, salmon and peas intended for children at 12 months of age. Pasta was boiled in water and minced with rape seed oil before being frozen in units. Salmon was gently warmed together with root celery, milk, cream, lemon juice and spices. The resulting sauce was frozen in units. Green peas, sweet corn and onions were steamed before being minced and frozen in units. An appropriate combination of units was placed in a plastic, microwave safe plate and covered with plastic film including a valve. The plate was sold as a ready-to-eat meal for families eating outside home. The plate, still covered by the plastic film with valve, was put in the microwave oven for heating to eating temperature. The heating was stopped immediately at the sound coming from the valve when the food was warm enough to release steam that opened the valve.

Ingredients: Milk (1.5% fat), salmon, pasta (durum wheat, egg), green peas, root celery, sweet corn, cream (40% fat), yellow onion, tomato puree, maize starch, lemon juice, dill, rape seed oil, salt, white pepper.

CML=47.6 mg/kg protein

Example 7

Degree of starch gelatinisation in a composite meal was determined by using differential scanning calorimetry (DSC) as described by Holm et al [3].

Example 8

Degree of starch gelatinisation in a composite meal was determined using enzymatic digestion with glucoamylase as described by Holm et al [3].

REFERENCES

1. Tareke, E., et al., *Isotope dilution ESI-LC-MS/MS for quantification of free and total Nε-(1-Carboxymethyl)-1-Lysine and free Nε-(1-Carboxyethyl)-1-Lysine: Comparison of total Nε-(1-Carboxymethyl)-1-Lysine levels measured with new method to ELISA assay in gruel samples.* Food Chemistry, 2013. 141(4): p. 4253-4259.
2. Brouns, F., et al., *Glycaemic index methodology.* Nutrition Research Reviews, 2005. 18(1): p. 145-171.
3. Holm, J., et al., *Degree of Starch Gelatinization, Digestion Rate of Starch Invitro, and Metabolic Response in Rats.* American Journal of Clinical Nutrition, 1988. 47(6): p. 1010-1016.

The invention claimed is:

1. A method of producing a nutritionally balanced composite meal for infants, comprising at least one carbohydrate containing meal component and at least one protein containing meal component, the method comprising:
    a) heat-treating said carbohydrate containing meal component and said protein containing meal component separately,
    b) disintegrating, homogenizing or mincing said carbohydrate containing meal component and said protein containing meal component prior to step c), and
    c) packaging said carbohydrate containing meal component and said protein containing meal component separately,
    wherein said heat-treating comprises cooking of said carbohydrate containing meal component and said protein containing meal component at ambient pressure and with time/temperature conditions that guarantee gelatinization of starch and inactivation of enzyme inhibitors; and
    said heat-treating is conducted such that Insulinaemic Index (II) (white wheat bread reference determined) of said composite meal is not more than 100% above the Glycaemic Index (GI) (white wheat bread reference determined) of said composite meal.

2. The method according to claim 1, in which said carbohydrate containing meal component and said protein containing meal component in step a) are subjected to heat-treatment by boiling, oven-baking, steam injection, infra-red-or microwave treatment, or combinations thereof.

3. The method according to claim 1, wherein said packaging step comprises freeze-drying said carbohydrate containing meal component and said protein containing meal component and storing said freeze-dried carbohydrate containing meal component and said protein containing meal component at ambient temperature or below +8° C. in airtight and light protected packages; or wherein said packaging steps comprises freezing and storing said carbohydrate containing meal component and said protein containing meal component in a freezer in air-tight and light protected packages immediately after the heat-treating step.

4. The method according to claim 1, wherein said carbohydrate containing meal components and said protein containing meal component are separately divided and frozen into suitable portions adjusted for the age of the infant.

5. The method according to claim 1, wherein the heat-treating step (a) is conducted such that starch in said carbohydrate containing meal component is fully gelatinized.

6. The method according to claim 1, wherein the heat-treating (a) is conducted such that carboxymethyl-lysine (CML) levels for the composite meal are kept lower than 72 mg/kg protein as measured using ELISA methodology.

7. The method according to claim 1, wherein the heat-treating step (a) is conducted such that the carbohydrate containing meal component and the protein containing meal component have a value, obtained by multiplying the Glycaemic Index (GI) (white wheat bread reference determined) and the Insulinaemic Index (II) (white wheat bread reference determined) of said composite meal (GI×II), that does not exceed 10,000.

8. The method according to claim 1, wherein, the heat-treating step (a) is conducted such that:
said carbohydrate containing meal component is fully gelatinized;
carboxymethyl-lysine (CML) levels in said composite meal are kept lower than 72 mg/kg protein as measured using ELISA methodology;
the composite meal has a value, obtained by multiplying the Glycaemic Index (GI) (white wheat bread reference determined) and the Insulinaemic Index (II) (white wheat bread reference determined) of said composite meal (GI×II), that does not exceed 10,000; and
the Insulinaemic Index (II) (white wheat bread reference determined) of said composite meal is not more than 100% above the Glycaemic Index (GI) (white wheat bread reference determined) of said composite meal.

9. The method according to claim 1, wherein the carbohydrate containing meal component is selected from the group consisting of cereals, pseudo-cereals, tubers, legumes and combinations thereof.

10. The method according to claim 1, wherein the protein containing meal component is selected from the group consisting of meat, fish, poultry, egg, milk, protein rich vegetable sources from the group consisting of soy, quinoa, cereals, myco-protein and combinations thereof.

11. The method according to claim 1, wherein said carbohydrate containing meal component or said protein containing meal component further comprises at least one probiotic bacteria.

12. The method according to claim 11, wherein the probiotic bacteria is selected from the group consisting of *Lactobacillus, Bifidobacterium, Roseburia, Akkermancia, Prevotella* and a combination thereof.

13. The method according to claim 1, wherein said carbohydrate containing meal component further comprises at least one prebiotic carbohydrate.

14. The method according to claim 13, wherein the prebiotic carbohydrate is selected from the group consisting of inulins, fructans, arabinoxylans, arabinogalactans, galacto-oligosaccharides, beta-glucans, resistant starch, lactulose, raffinose, melibiose and combinations thereof.

* * * * *